(12) United States Patent
On et al.

(10) Patent No.: US 8,786,553 B2
(45) Date of Patent: Jul. 22, 2014

(54) NAVIGATION PAD AND METHOD OF USING SAME

(75) Inventors: Peter On, San Diego, CA (US); Cynthia Gwyn Tinker, San Diego, CA (US); Eduardo Ahumada Apodaca, La Jolla, CA (US)

(73) Assignee: KYOCERA Corporation, Kyoto (JP)

( * ) Notice: Subject to any disclaimer, the term of this patent is extended or adjusted under 35 U.S.C. 154(b) by 1691 days.

(21) Appl. No.: 11/539,274

(22) Filed: Oct. 6, 2006

(65) Prior Publication Data

US 2008/0084397 A1 Apr. 10, 2008

(51) Int. Cl.
*G06F 3/041* (2006.01)

(52) U.S. Cl.
USPC .......................................... 345/173; 345/174

(58) Field of Classification Search
USPC .................................. 345/166–179
See application file for complete search history.

(56) References Cited

U.S. PATENT DOCUMENTS

| | | | |
|---|---|---|---|
| 3,757,322 A | 9/1973 | Barkan et al. | |
| 6,925,315 B2 * | 8/2005 | Langford | 455/575.1 |
| 7,215,321 B2 * | 5/2007 | SanGiovanni | 345/156 |
| 7,499,040 B2 * | 3/2009 | Zadesky et al. | 345/204 |
| 7,519,748 B2 * | 4/2009 | Kuzmin | 710/67 |
| 2003/0076306 A1 * | 4/2003 | Zadesky et al. | 345/173 |
| 2004/0113877 A1 | 6/2004 | Abileah et al. | |
| 2006/0197750 A1 * | 9/2006 | Kerr et al. | 345/173 |
| 2006/0238514 A1 * | 10/2006 | Rosenberg et al. | 345/173 |
| 2007/0040811 A1 * | 2/2007 | Yang et al. | 345/173 |
| 2007/0046637 A1 * | 3/2007 | Choo et al. | 345/169 |
| 2007/0070049 A1 * | 3/2007 | Lee et al. | 345/173 |
| 2007/0120834 A1 * | 5/2007 | Boillot | 345/173 |
| 2007/0152977 A1 * | 7/2007 | Ng et al. | 345/173 |
| 2007/0152979 A1 * | 7/2007 | Jobs et al. | 345/173 |
| 2007/0152983 A1 * | 7/2007 | McKillop et al. | 345/173 |
| 2007/0222765 A1 * | 9/2007 | Nyyssonen | 345/173 |
| 2007/0262963 A1 * | 11/2007 | Xiao-Ping et al. | 345/173 |
| 2008/0018617 A1 * | 1/2008 | Ng et al. | 345/176 |
| 2012/0206392 A1 * | 8/2012 | Ng et al. | 345/173 |
| 2013/0093728 A1 * | 4/2013 | Oh et al. | 345/175 |

FOREIGN PATENT DOCUMENTS

| | | |
|---|---|---|
| EP | 1 251 455 | 10/2002 |
| EP | 1 542 437 | 6/2005 |
| WO | WO 2006/135127 | 12/2006 |
| WO | WO 2007/078477 | 7/2007 |
| WO | WO 2007/078478 | 7/2007 |

* cited by examiner

*Primary Examiner* — Alexander Eisen
*Assistant Examiner* — Nelson Lam

(57) ABSTRACT

A handheld electronic device has an outer face in which a user display and a navigation touch pad are located. The touch pad is adapted to provide a user input for controlling at least one function of the electronic device. A plurality of touch sensors are located at predetermined locations about the area of the touch pad and detect touching by a user's finger in order to provide an output control signal. A light source is associated with each touch sensor. A control unit receives input from the touch sensors and activates each light source in turn as the associated touch sensor is touched by a user, so that the user receives visual feedback as they are controlling the device.

14 Claims, 2 Drawing Sheets

NAVIGATION PAD AND METHOD OF USING SAME

FIELD OF THE INVENTION

The present invention relates to navigation pads for personal electronic devices, such as handheld wireless communication devices or media players.

BACKGROUND

There are many different types of user input or navigation devices for controlling personal electronic devices such as cellular phones, personal digital assistants, portable computers, media players, and the like. Such input devices generally comprise keypads, touch pads, touch screens, and the like. With a touch pad, movement of an input pointer on a screen corresponds to movement of a user's finger or a pointer over the surface of the touch pad. Navigation mechanisms in the form of keys for wireless communication devices (e.g., cellular phones) have been used in the past for navigating through and selecting menu items displayed on the wireless communication device.

A need exists for an improved navigation mechanism in the form of a navigation pad for a handheld device, especially a handheld wireless communication device, that enhances the user experience with the wireless communication device.

SUMMARY

An aspect of one embodiment involves a dial-type or circular navigation pad which lights up in a region touched by the user. In one embodiment, a light emitting diode ("LED") light follows the user's finger as the user runs their finger around the edge of the circle. In other words, each region of the pad lights up as it is touched by the user's fingertip. This provides visual feedback as the user interacts with menu items on the screen.

One embodiment comprises a cell phone or other portable wireless communication device having a touch pad for user input in controlling the device to make telephone calls or perform other functions. A series of light sources are provided at spaced intervals around the pad, each associated with a touch sensor location on the pad. In one embodiment, each light source comprises a radially extending light pipe with a light emitter such as a light emitting diode (LED) at one end of the pipe. The light pipes may be radially arranged in the same manner as an analog clock face, and may be controlled such that pairs of light pipes are illuminated to indicate current time when the touch pad is not in use.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a navigation pad for controlling a hand-held or personal electronic device such as a cellular phone in which regions of the pad are arranged to light up in response to touch by a user's fingertip, and a method of using the same.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
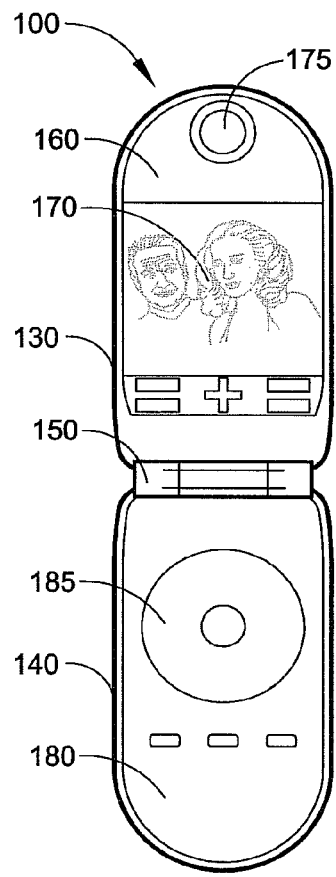
FIG. 1 is a front elevation view of a wireless phone according to one embodiment.

FIG. 1 illustrates portable communication device or cell phone 100 having a clam-shell configuration with first housing portion 130 and second housing portion 140 pivotally connected to each other at hinge 150. First housing portion 130 includes front 160 with display 170 and speaker 175 therein. Second housing portion 140 includes front wall 180 incorporating navigation pad 185 according to one embodiment. Although cell phone 100 is shown and described as having a clam-shell configuration, in alternative embodiments, phone 100 includes alternative configurations such as, but not limited to, a candy bar configuration, and a configuration where first housing portion 130 and second housing portion 140 are slidable relative to each other. Although navigation pad 185 in FIG. 1 is the user input device of portable phone or cell phone 100 in the illustrated embodiment, such a pad is incorporated in other types of personal electronic devices in alternative embodiments, such as portable media players, game players, cell phones incorporating media players, portable digital assistants, and the like.

Navigation or touch pad 185 is illustrated in more detail in FIGS. 1A and 2 to 6. Navigation pad or touch pad 185 is configured to provide one or more control functions for controlling operation of the device in which it is installed, such as portable or cellular phone 100 as in FIG. 1. The control function may be a scrolling function, in which a cursor or highlighted region scrolls down over menu items displayed on display screen 170 as the user runs their finger around pad 185. When a desired menu item is reached, the user can select the item by touching a central control region or button, or in any other suitable manner such as tapping the finger on touch pad 185. The displayed menu items may include all conventional menu selections for portable device 100 in which navigation pad 185 is installed. For example, when device 100 is a cell phone, menu items can include a phone directory and a list of telephone numbers through which a user can scroll in order to select a number to be called. Menu items may also include other selections such as voice mail, Internet, music playing, setup options, and the like, which can lead to other menus with specific selections within the category concerned.

Figure 1A:
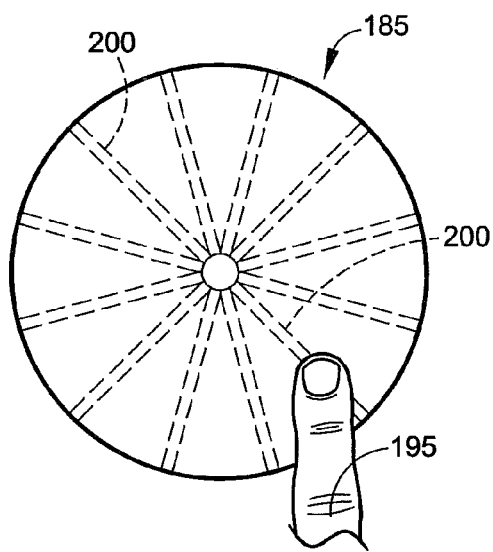
FIG. 1A is an enlarged view of the touch pad of the phone of FIG. 1, illustrating a finger running around the pad to light up light sources embedded in the pad while activating touch sensors for controlling a function of the phone.
Figure 2:
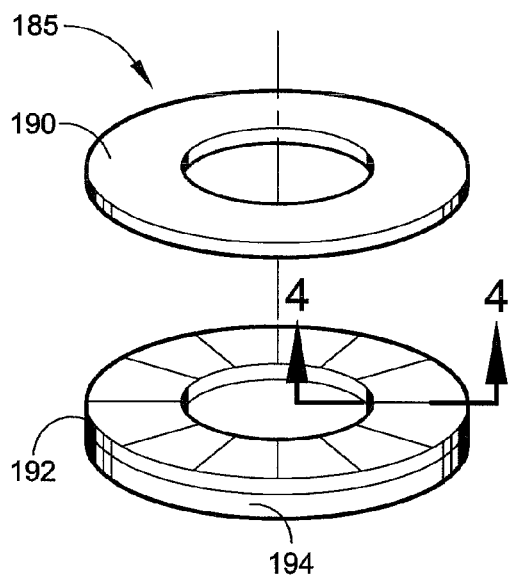
FIG. 2 is an exploded view of the annular touch pad of the phone of FIG. 1.

Navigation pad or touch pad 185 is a capacitative touch pad in one embodiment, but other types of touch pads are used in alternative embodiments, such as resistive touch pads and surface acoustic wave touch pads. Although touch pad 185 illustrated in the drawings is of annular or circular shape, it should be noted that the peripheral shape of pad 185 may be different in other embodiments, such as rectilinear, or non-circular curvilinear shapes. Although touch pad 185 is open at the center in the illustrated embodiment, touch pad 185 may be of circular or other shapes, without any central opening, in alternative embodiments. In the illustrated embodiment, touch pad 185 is of annular shape, and has touchable outer layer 190 of transparent or translucent material, electrode or sensor layer 192, and circuit board or control layer 194, as illustrated in FIG. 2. Touch pad is 185 configured to detect changes in capacitance as a user moves finger 195 in a rotational path about touch pad 185, as illustrated in FIG. 1A.

Figure 4:
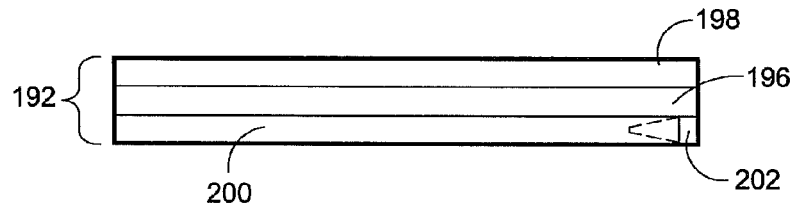
FIG. 4 illustrates the sensor layer of the touch pad of either of the embodiments of FIGS. 1 and 2 or 3.

Electrode or sensor layer 192 in one embodiment is illustrated in more detail in FIG. 4 and has transparent substrate layer 196, plural electrodes or capacitative sensors 198 in a predetermined pattern on one face of substrate layer 196, and plural radially extending light pipes 200 mounted on the inner face of substrate layer 196 at predetermined angular spacings. Light pipes 200 may alternatively be embedded in layer 196. Sensors 198 in one embodiment are arranged in radial lines corresponding to light pipe positions, as indicated in the drawings. In alternative embodiments, different numbers of radially extending light pipes and aligned sensors are provided, depending on the number of different control inputs desired. In the illustrated embodiment, light pipes 200 and aligned touch sensors 198 are provided at similar positions to a clock face, i.e., with twelve light pipes 200 at equal angular spacings of about thirty degrees around touch pad 185.

Each light pipe 200 is a transparent pipe lined with optical lighting film, having a light emitting diode (LED) 202 or other suitable light emitter at one end. In the illustrated embodiment, LEDs 202 are provided at the outer ends of light pipes 200, although they may be located at the inner ends of light pipes 200 in alternative embodiments. LEDs 202 are suitably connected to control electronics (not illustrated) in layer 194 to be actuated when corresponding overlying sensor or sensors 198 are touched by a user of the device. It should be noted that sensors 198 are also connected to control electronics 194 in a manner known in the touch pad field.

Figure 5:
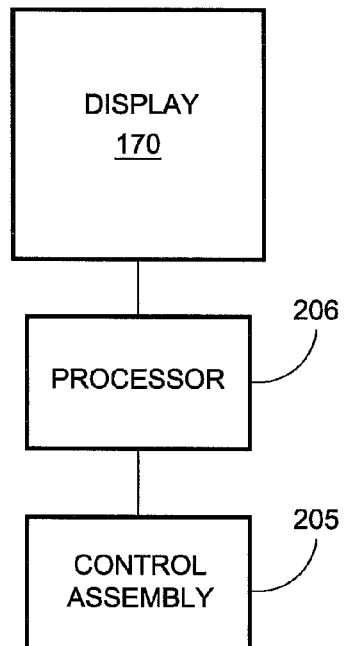
FIG. 5 is a simplified block diagram of a touchpad/display system according to one embodiment.
Figure 5:
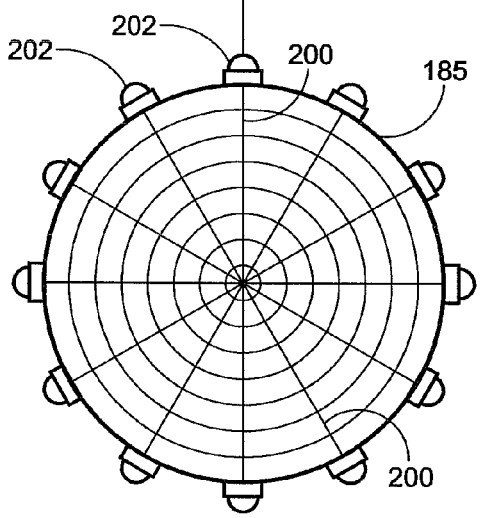

As illustrated in FIG. 5, control assembly 205 is coupled to touch pad 185 to receive inputs from sensors 198 and to supply corresponding signals to processor 206 of the portable device, such as cell phone 100, and also to control operation of light pipes 200. Control assembly 205 is incorporated in circuit board layer 194 of navigation or touch pad 185. In alternative embodiments, control assembly 205 is a separate control unit mounted in phone or device housing 140 and connected to touch pad 185. Control assembly 205 is an application specific integrated circuit (ASIC) or other type of circuit which monitors the outputs of sensors 198, converts sensor outputs to an angular position and direction, supplies outputs to processor 206 for controlling a scrolling function on display 170, and provides power to LEDs 202 associated with light pipes 200 based on detected sensor outputs, as described in more detail below.

Control assembly 205 is configured such that light pipes 200 light up based on the position of user's finger 195 or another pointer device on navigation or touch pad 185, as indicated in FIG. 1A. The user runs finger 195 around pad 185 in a circular path, and this results in scrolling down of items in a menu displayed on screen 170. In this embodiment, in addition to controlling a function of the personal electronic device requiring user input, such as the scrolling function, touch pad 185 lights up at the region touched by user's finger or pointer 195, and the lighted regions follow the user's finger as the finger touches and runs around navigation or touch pad 185. In FIG. 1A, the illuminated region is light pipe 200A which user's finger 195 is touching, and light pipes 200 indicated in dotted outline in FIG. 1A light up and go out successively as the user runs his or her finger around pad 185, providing an attractive effect. Different shapes and sizes of lights may be provided in alternative embodiments. For example, instead of continuous radial light pipes 200 as illustrated, smaller, spaced LED lights are provided in alternative embodiments to light up at the radial position of finger or pointer 195. Navigation pad 185 therefore provides visual feedback to a user during interaction with commands on the screen.

Figure 3:
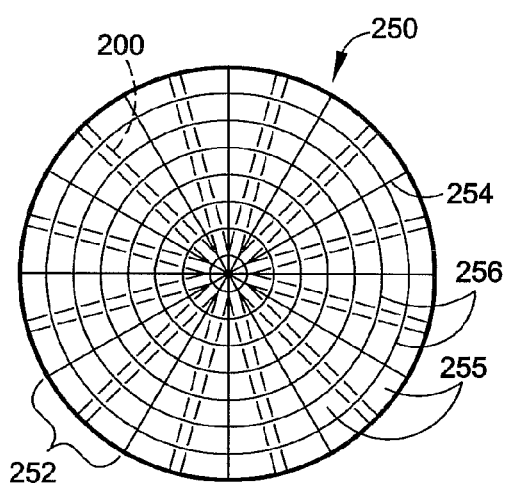
FIG. 3 is a top plan view of another embodiment of a sensor arrangement for the touch pad.

In the first embodiment, touch sensors 198 are positioned on radially extending lines coincident with light pipes 200 so as to detect angular position of a finger on touch pad 185. FIG. 3 illustrates an alternative embodiment in which navigation or touch pad 250 has a modified sensor arrangement which includes sensors positioned to detect both angular and radial position of a user's finger or pointer on touch pad 185. This embodiment includes light pipes 200 positioned in generally the same way as in the previous embodiment, as illustrated by the dotted lines in FIG. 3. Touch pad 250 is divided into sectors 252 defined by radial lines 254, and each sector is in turn divided into separate radial sensor zones or areas 255 by spaced circular lines or divisions 256. A touch sensor is located in each radial zone 255. Each light pipe 200 extends radially through respective sector 252. Alternatively, a separate LED is located beneath each zone 255, so that only the zone 255 which a finger is touching lights up. Touch pad 250 is used to control different functions based on angular and radial touch position, such as a scrolling function based on sector 252 in which the finger is located, and another function such as volume control, brightness, or the like is provided based on radial position of the finger.

Figure 6:
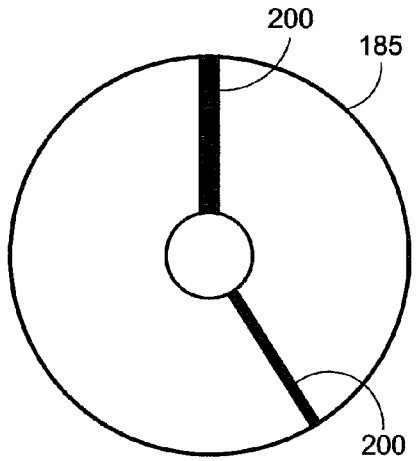
FIG. 6 is a top plan view of the touch pad of FIGS. 1 to 5 illuminated to provide a current time indication.

When a user is operating the personal electronic device, such as cell phone 100, and providing input on navigation pad 185, light pipes 200 light up successively as the user runs his or her finger around pad 185, as explained above. In one embodiment, control assembly 205 is configured to control navigation pad 185 to default to an analog clock when the dial or input function is not in use, as illustrated in FIG. 6. At any one time, control assembly 205 actuates two LEDs 205 to illuminate associated light pipes 200 at positions corresponding to analog clock hands indicating an actual time, as illustrated in FIG. 6. The clock indicates a time of five o'clock in FIG. 6, by lighting up two light pipes 200 at the positions corresponding to 12 and 5 on an analog clock face. Control assembly 205 includes a clock to control actuation of successive light pipes in five minute increments based on actual time.

Figure 7:
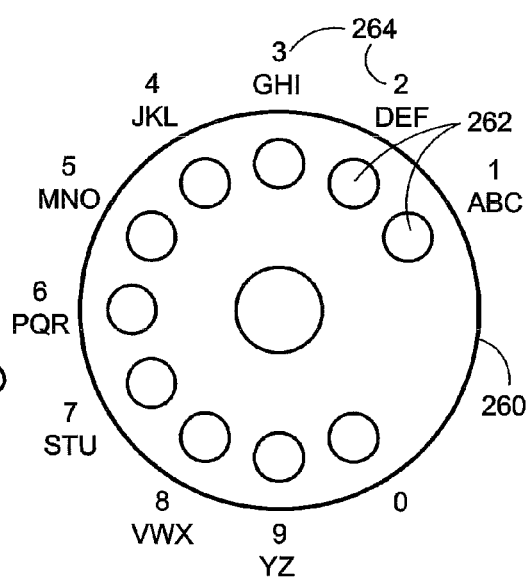
FIG. 7 is a top plan view illustrating an embodiment of the touch pad with graphical indicia corresponding to a rotary phone dial.

FIG. 7 illustrates navigation pad 260 according to another embodiment which includes graphics or indicia associated with pad 260 for simulating a rotary telephone dial. As in the previous embodiments, pad 260 is of annular shape and has touch pad layers equivalent to those illustrated in FIG. 2 for the first embodiment. Indicia on the outer layer comprise a series of small circles 262 at positions corresponding to dial positions on a rotary telephone dial. Indicia 264 on the face of the device around the periphery of pad 260 comprise the number and letter combinations for each dial position or circle 262. LEDs and touch sensors are located in alignment with each circle 262 so that circles 262 light up successively as a user runs his or her finger over circles 262.

The above embodiments may be implemented by a combination of hardware and software, or by hardware or software alone. Although these embodiments were described in connection with a portable communication device such as a cellular phone or personal digital assistant (PDA), the navigation or touch pad may be incorporated for user input on any personal electronic device, such as any type of media player, a still or video camera, or the like, a laptop computer, or a phone or PDA which may also have media playing capabilities, Internet access capabilities, or the like. Although the touch pad is described as controlling a scrolling function, it may alternatively or additionally be configured to provide other control inputs to the portable device. The lighting up of regions of the pad successively as the user runs his or her finger over them enhances the user's experience when operating the device.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A handheld electronic device, comprising:
an outer housing having a front face;
a display screen in the front face;
a navigation touch pad mounted in the front face of the housing and adapted to provide a user input for controlling the electronic device, the navigation touch pad having a circular configuration with a center and a circumference;
the touch pad having a plurality of touch sensors at predetermined locations about the area of the touch pad adapted to detect touching by a user's finger and to provide an output control signal in response to touch detection, the touch sensors arranged at spaced angular intervals in a generally circular path around the touch pad and are adapted to detect movement of a finger in a corresponding circular path;
a plurality of light sources defining a single plane and extending linearly from the center to the circumference of the navigation touch pad and associated with each touch sensor, the light sources positioned to extend linearly and radially from the center to the circumference of the navigation touch pad at spaced intervals in the generally circular path, the light sources comprising light pipes, each light pipe linearly extending and continuously spanning from the center to the circumference of the navigation touch pad at spaced intervals in the generally circular path; and
a control unit adapted to activate each light source in response to receipt of an output control signal from the touch sensor associated with the light source.

2. The device of claim 1, wherein the sensor and light source locations are at equally spaced angular intervals around the touch pad.

3. The device of claim 2, wherein the sensor and light source locations are at thirty degree angular spacings around the touch pad.

4. The device of claim 1, wherein each light pipe has an inner end and an outer end, and a light emitting diode (LED) is mounted at the outer end of the light pipe to illuminate the pipe when activated by the control unit.

5. The device of claim 1, wherein the light sources are elongate and positioned at locations corresponding to the numeric positions on an analog clock face.

6. The device of claim 5, wherein the control unit includes a clock module adapted to control selected light sources to light up at equivalent positions to the hour and minute hand of an analog clock displaying current time when the touch pad is not in use.

7. The device of claim 1, wherein the touch pad has indicia at touch positions corresponding to dial positions on a rotary telephone dial, each sensor and associated light source being located at a respective touch position.

8. The device of claim 7, wherein the indicia comprise circles arranged in a circular path around the touch pad.

9. The device of claim 1, wherein the touch sensors are capacitative touch switches.

10. The device of claim 1, wherein the control unit is adapted to provide a control function output for controlling operation of the device in response to each output control signal from the touch pad.

11. The device of claim 10, wherein the control function output is associated with moving an object on the display screen.

12. A method of operating a navigation touch pad mounted on a personal electronic device, the touch pad having a circular configuration with a center and a circumference, comprising:
receiving finger or pointer touch input in a circular path about the touch pad;
detecting location and movement of the finger using a series of touch sensors positioned in a circular path on the touch pad;
lighting up a series of light sources around the touch pad in sequence as a series of touch sensors each associated with a respective light source receives the finger or pointer touch input, the light sources defining a single plane and positioned to extend linearly and radially from the center to the circumference of the navigation touch pad at spaced intervals in a generally circular path, the light sources comprising light pipes, each light pipe linearly extending and continuously spanning from the center to the circumference of the navigation touch pad at spaced intervals in the generally circular path; and
controlling at least one function of the electronic device in response to the detection by the touch sensors.

13. The method of claim 12, wherein using output from the touch sensors to control a function of the electronic device comprises scrolling down over menu items displayed in a screen of the electronic device based on the touch sensor output.

14. The method of claim 12, further comprising lighting up selected light sources to display a current time when no touch input is detected by the touch sensors.

* * * * *